April 19, 1966   E. RATH   3,246,592
AIR CONDITIONING FOR VEHICLE OF LADING
Filed Aug. 28, 1963   6 Sheets-Sheet 1
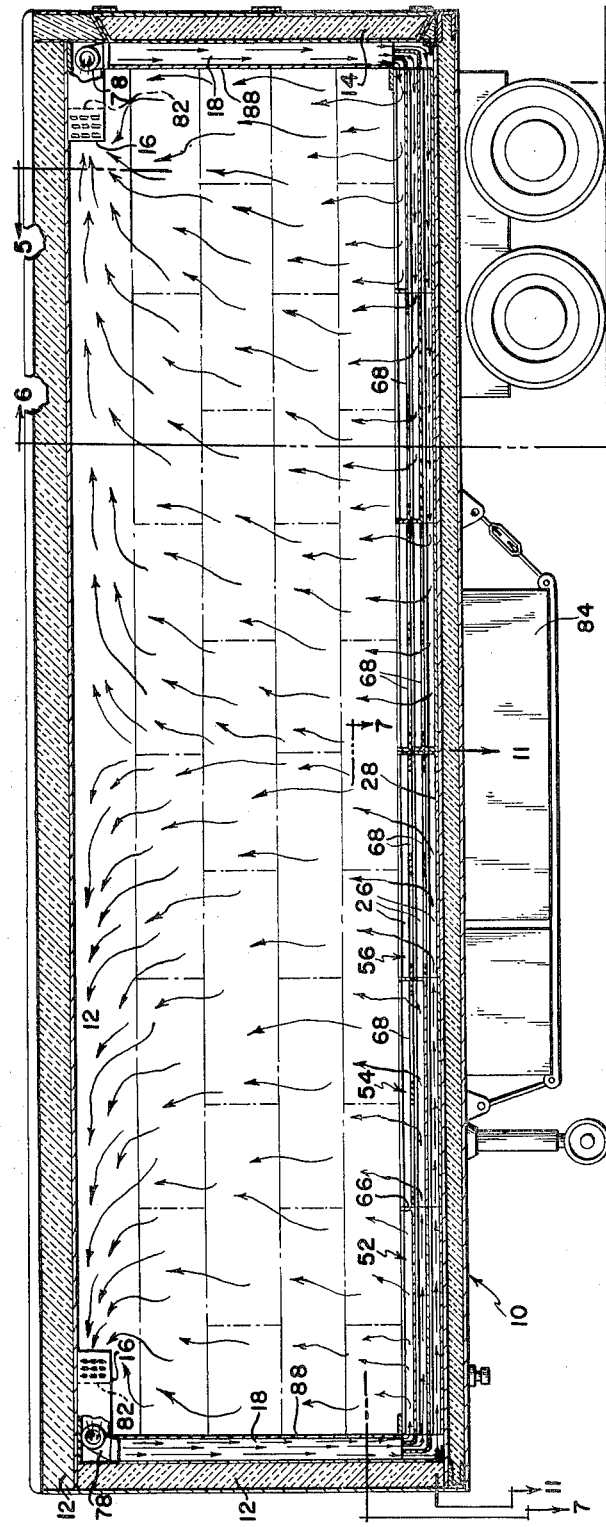
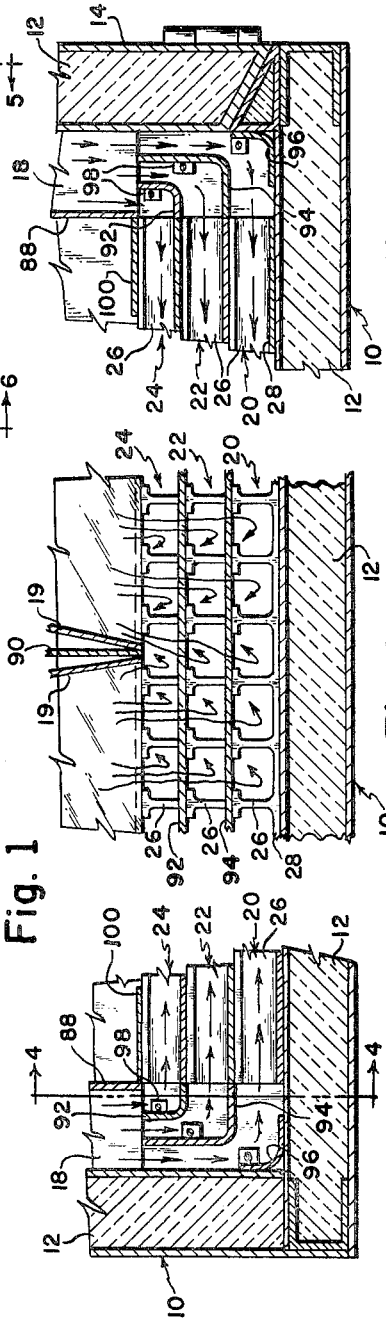
INVENTOR.
ERIC RATH
BY *John Cyril Malloy*
ATTORNEY April 19, 1966    E. RATH    3,246,592
AIR CONDITIONING FOR VEHICLE OF LADING
Filed Aug. 28, 1963    6 Sheets-Sheet 4

INVENTOR.
ERIC RATH
BY John Cyril Malloy
ATTORNEY

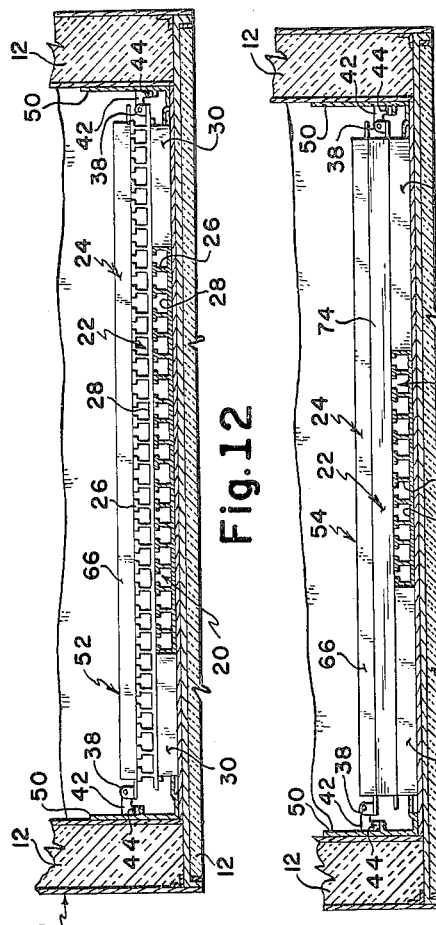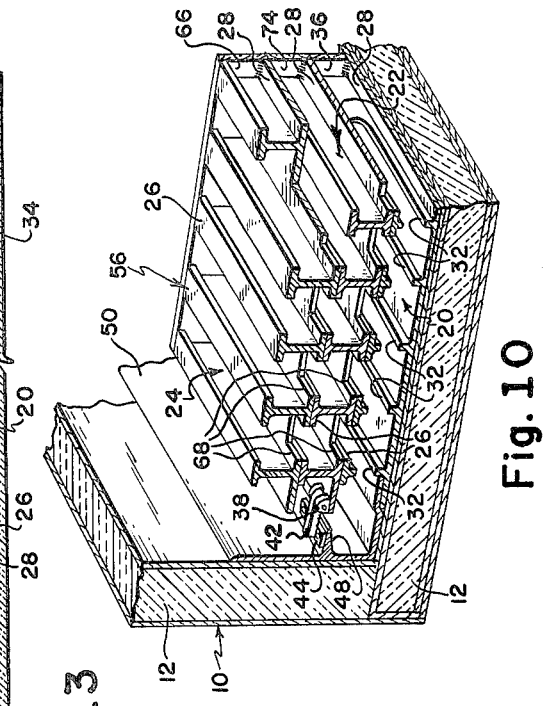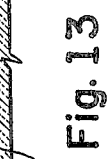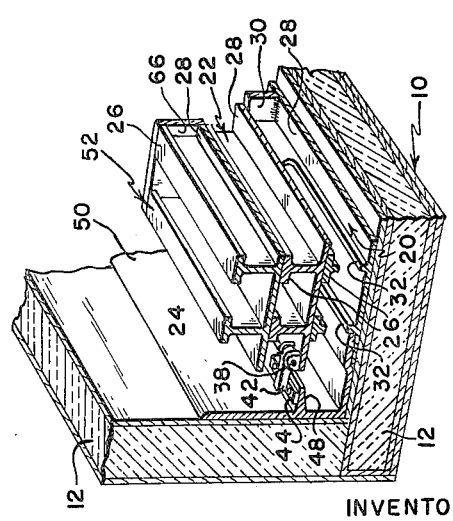

April 19, 1966   E. RATH   3,246,592
AIR CONDITIONING FOR VEHICLE OF LADING
Filed Aug. 28, 1963   6 Sheets-Sheet 6

INVENTOR.
ERIC RATH
BY
ATTORNEY

United States Patent Office 3,246,592
Patented Apr. 19, 1966

3,246,592
AIR CONDITIONING FOR VEHICLE OF LADING
Eric Rath, Miami, Fla., assignor to The Rath Company, Miami, Fla., a corporation of Florida
Filed Aug. 28, 1963, Ser. No. 305,130
5 Claims. (Cl. 98—31)

This invention relates to air conditioning particularly in connection with vehicles of lading, such as tractor-drawn trailer, but is also applicable to other load-containers, such as trucks or railway rolling stock, and may also include stationary structures.

The shipment of perishable foods is an accomplishment of long standing, and the problem of controlling the atmosphere ambient to the load has been handled according to a great variety of schemes, related to the two general basic concepts of ventilating and refrigerating, or a combination of the two. For instance, some perishables are loaded at atmospheric temperatures, and must be lowered in temperature by refrigeration, and kept at a lowered temperature to avoid spoilage, whereas others need no refrigeration, but only a system of ventilation, designed to absorb and carry off the heat engendered by the chemical process related to ripening, or aging in general.

If the material must be lowered in temperature after loading, it becomes important to provide an air movement which will permeate the load volumewise, whereas if the material is cold when loaded it is only necessary to treat the surface. Both of these considerations arise from the nature of heat flow in a solid body. For volume treatment it is not only necessary to distribute the air draft over an entire surface of the load, but also to provide interstices within the body of the load, as by somewhat loose piling, whereas in the case of surface treatment only, a wide reach of the draft is important, but the load should be packed solidly.

In the modern growth of the commerce of moving foodstuffs and other perishables, ever-increasing distance of carriage is contemplated, and this has led to the important concept of "piggy-back" transportation, wherein a loaded trailer may be transferred to a railroad car, or even a ship, and this has lent further emphasis to the problem of air conditioning.

A general object of the present invention is to provide for improved distribution of a moving current of air so as to avoid imbalance of treatment of a load. More particularly, it is an object to subdivide a main supply of moving air into a cascade system for delivery in substantially unmodified or undiminished form to selective zones in the load chamber.

The prior art has contemplated surface treatment by a draft communicated to spaces at the sides of a load, for upward movement, and also volume treatment by means of an air space located below the load, and it is another object of this invention to provide a means adapted for adjustable positioning, so as to accomplish either of these functions alternatively. More particularly, it is an object to provide a three-tier system of selectively foraminated flooring, two tiers of which are swingable upward to a vertical position on opposite sides of the loading chamber. Related to the foregoing object, a further object is to provide a heat-conducting jacket on opposite sides of the load, for thermal equalization during surface treatment.

Yet another object is to provide alternative surface and volume conditioning, each involving a distributed draft, lengthwise of the load.

These and other objects, which will be apparent, are attained by the present invention, a preferred form of which is described in the following specification, as illustrated in the drawing, in which:

FIG. 1 is a vertical, sectional view, taken longitudinally of a trailer body;

FIGS. 2 and 3 are enlarged views of portions of the respective lower left and right hand corners of FIG. 1 showing details of construction;

FIG. 4 is a fragmentary, vertical sectional view, taken on the plane of the line 4—4 of FIG. 2;

Figure 7:
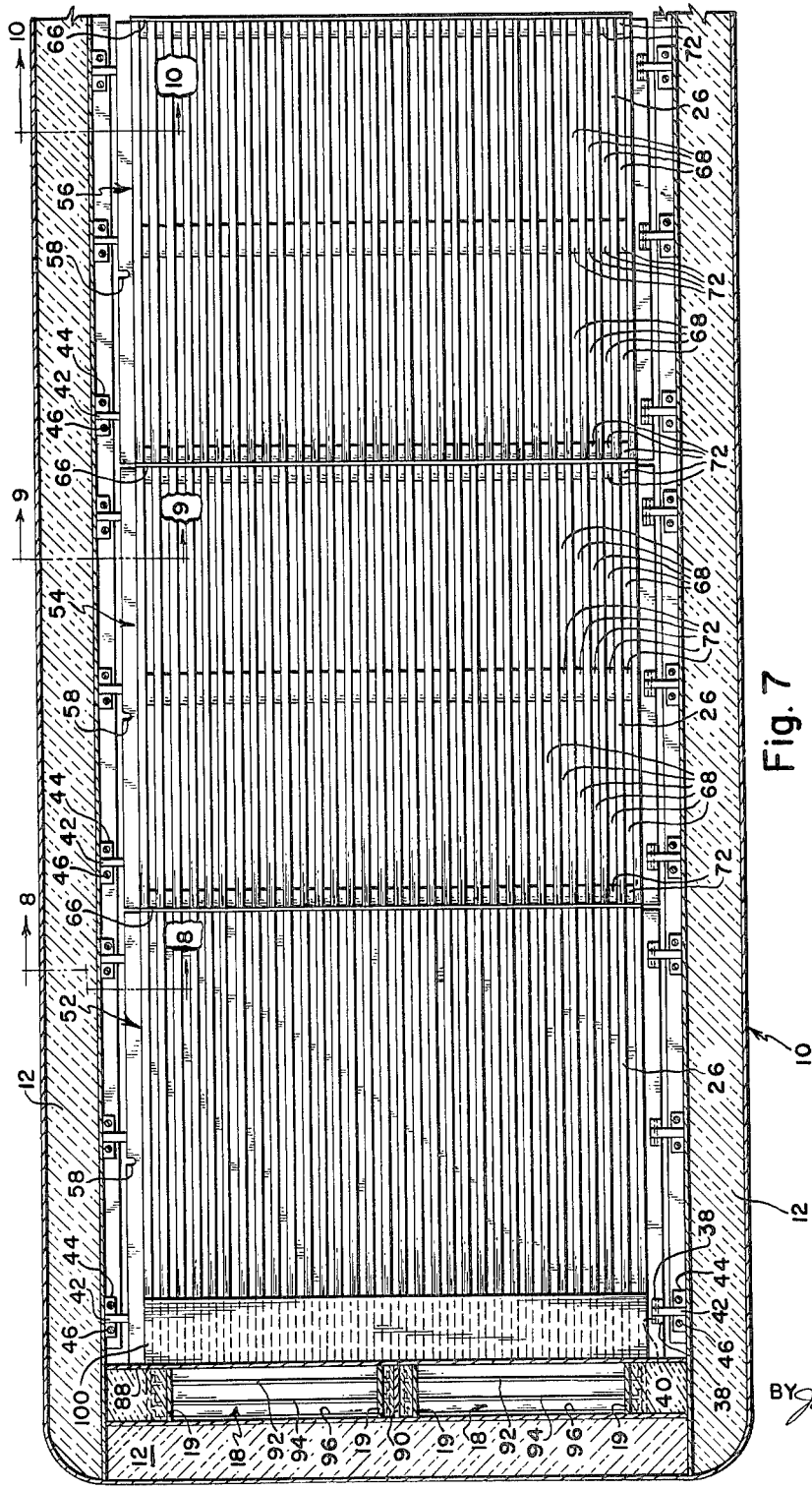
FIG. 7 is a horizontal sectional view covering half the length of the trailer body, as taken on the plane of the line 7—7 of FIG. 1, and enlarged.
Figure 11:
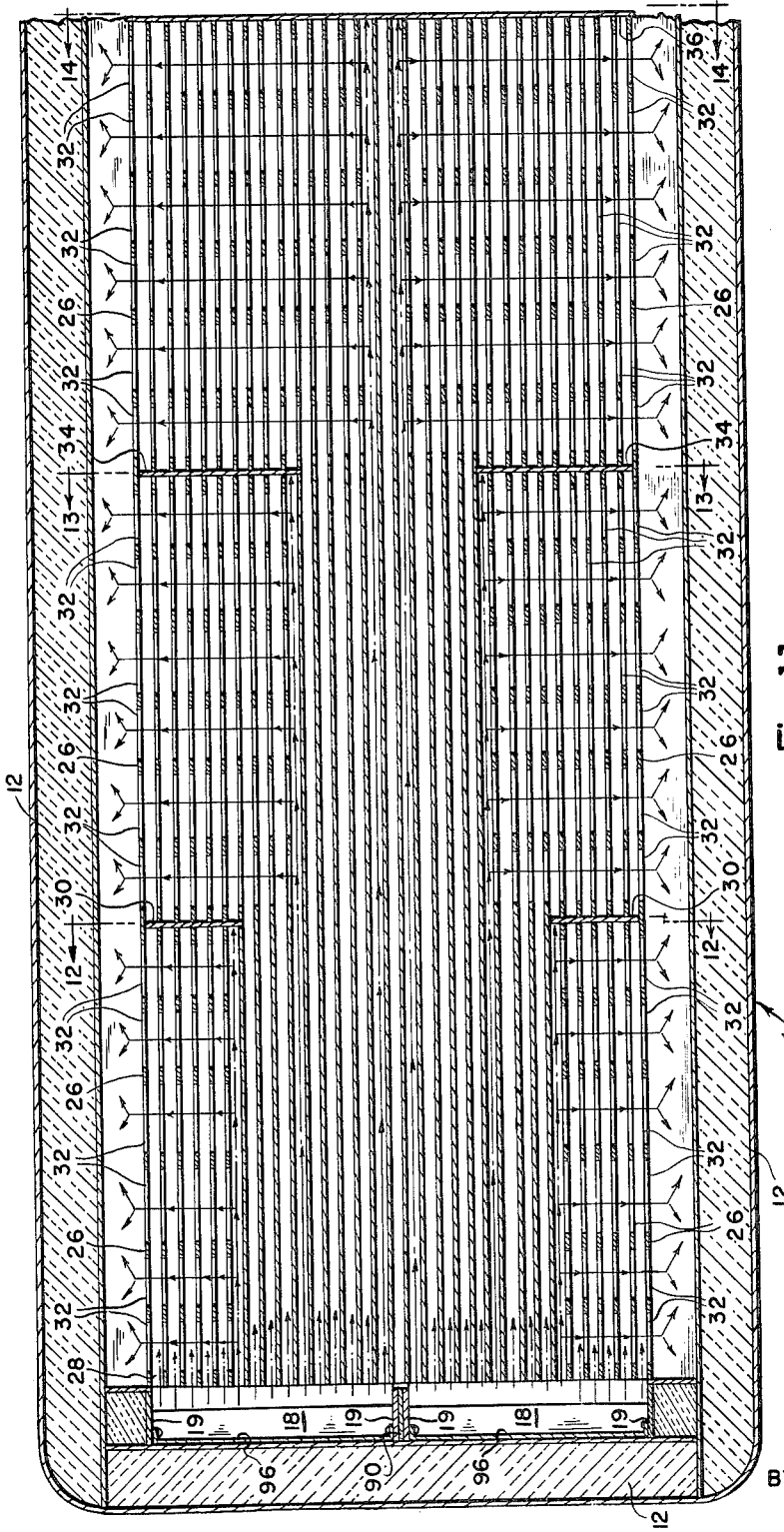
Figure 14:
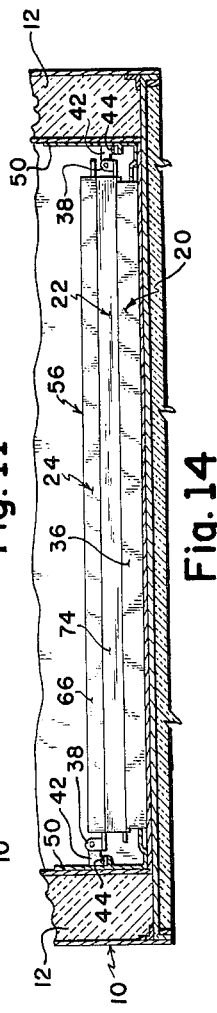

FIGS. 8, 9 and 10 are fragmentary, sectional views, in perspective, on enlarged scale, of portions of the trailer body, taken respectively, on the lines 8—8, 9—9 and 10—10 of FIG. 7;

FIG. 11 is a view similar to FIG. 7, but taken at a lower level, as indicated by the line 11—11 of FIG. 1; and FIGS. 12, 13 and 14 are vertical, sectional views, taken, respectively, on the planes of the lines 12—12, 13—13, and 14—14 of FIG. 11.

Referring to the drawing by characters of reference, there is shown, in general outline, a conventional trailer body 10, intended for thermal conditioning of the loads, and therefore having suitable layers of insulation 12, at its side walls, top and bottom. At one end (right in FIG. 1), the insulation is carried in a pair of doors 14, which also carry certain parts of the ductwork, as hereinafter set forth.

In either of the alternative modes of operation of the system of the present invention, circulation is such that air is drawn into upper intake ducts 16, spanning the width of the body at ceiling level, passes down through a pair of horn-shaped, vertical ducts, 18, with enlarged ends at the bottom, which communicate the draft to the floor section of the body for distribution lengthwise thereof. Since the ducts are provided at each end, this distribution extends only to the middle of the longitudinal extent of the body. At the rear end of the body the ducts 18 are carried by the respective, doors 14, and swing therewith.

The arrangement giving rise to selective distribution of the air draft lengthwise of the car is embodied in certain structure positionable along the vehicle bottom, and certain other, co-operating structure associated with the ducts 18. More particularly, the floor structure is three-tiered, in one mode of use, and the said co-operating structure comprises baffles arranged for delivery of divided streams of air to the respective tiers, as will be detailed hereinafter.

Features of the floor structure are illustrated in several of the views, and with particular reference to FIG. 4, it will be seen that the system, which is honey-combed in form, when fully positioned horizontally, comprises three tiers 20, 22, 24. Of these, the bottom tier, as it appears in FIG. 4, may be taken as conventional in form, position, and generalized theory of use, in the provision of a spacer element, which supports a load in spaced relation to the floor proper, to accommodate a draft, and which permits upward escape of the air current. Thus, the bottom tier comprises a plurality of rail-like elements 26, of T section, interconnected by a common, plate-like, base member 28. In prior art uses, a gridwork of this sort has been employed alone, in the ventilation of loads not requiring refrigeration, and did not provide for distribution of the conditioning air, as by fractionation. According to the present invention, not only is such distribution provided for, but in addition, the lowermost tier of gridwork is also arranged for a distribution which comes into play in the case of an entrainment of the upward currents of air at the sides of the load, as in the case of the merely surfaced treatment required in maintaining a load in refrigerated condition.

Figure 6:
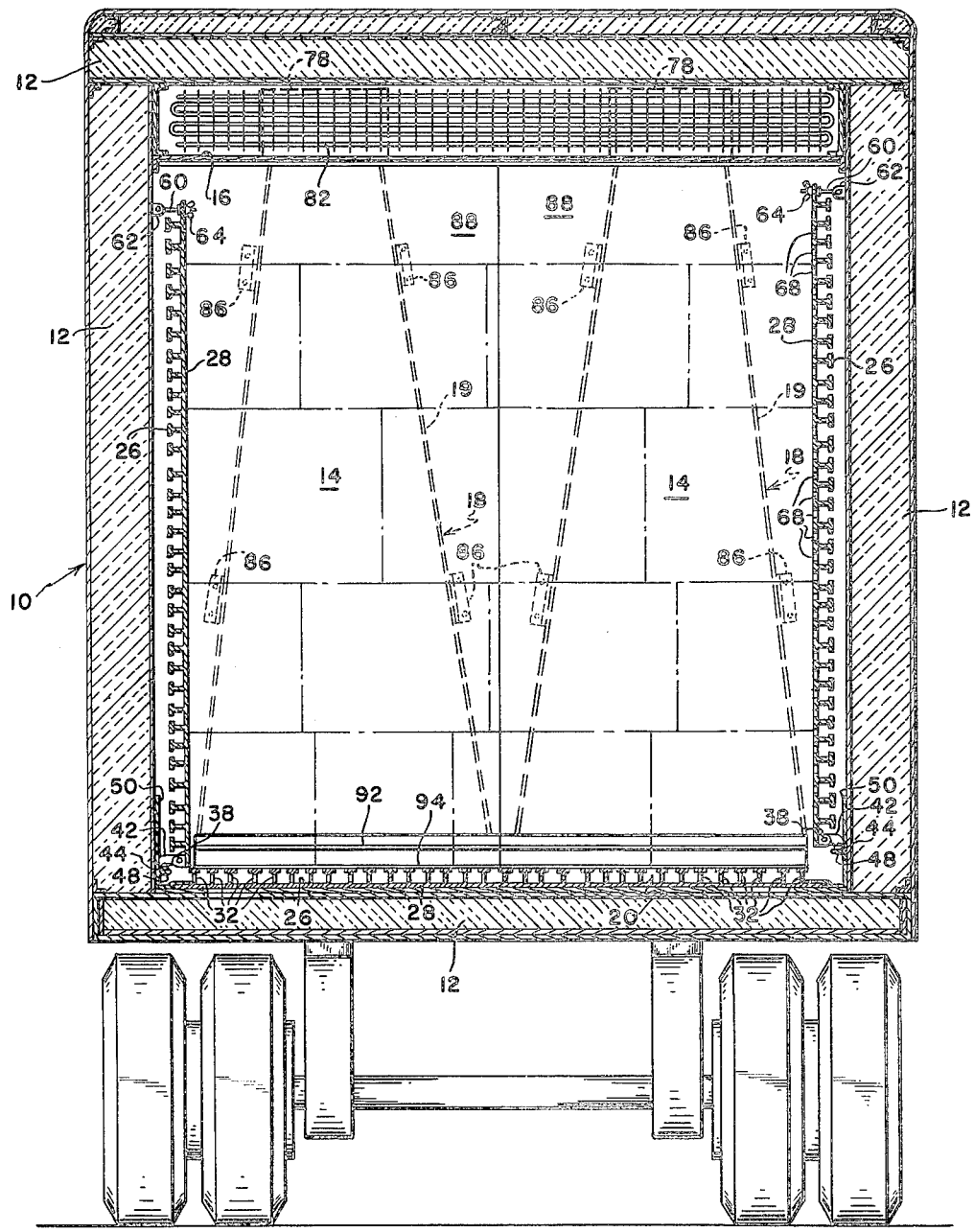
FIG. 6 is a view similar to FIG. 5, but looking in the opposite direction therefrom, as taken on the plane of the line 6—6 of FIG. 1, and showing the upper two floor tiers in vertical, stowed position.

The manner of accomplishing what has just been referred to as surface treatment, may be explained with reference to FIG. 11, which shows the general pattern of distribution, lengthwise of one half of the vehicle, and FIG. 6, which shows the load as resting directly on the tops of T members 26 and tightly compacted so as to prevent permeation of the upward draft, volumewise through the load. FIGS. 8, 9 and 10, which show the three-tier arrangement, are also helpful in illustrating the apertures in the members 26, and the bulkheads, which govern lateral movement of the air stream. The bulkheads are further illustrated in FIGS. 12, 13 and 14. Thus, assuming a supply of forced air available at one end of the lower tier, it will be seen from the pattern of the arrows in FIG. 11, that in a zone located centrally of the transverse extent of the body, and extending about one-third of the width thereof, the current of air moves unimpeded along the passages, until it reaches the zone of the final one-third of the floor area of one end of the vehicle, in which zone it moves laterally in both directions to the sides of the load, where it moves upwardly. A second third of the available air draft passes in two streams on opposite sides of the central stream, and passes laterally out from the two sides of the middle one-third of the floor-space area, and the third equal portion of the air stream enters only the first one-third zone of the vehicle half, in equal parts on opposite sides of the middle stream, and passes out laterally on the two sides of the load. The structure by which this is accomplished is described as follows:

As seen in FIGS. 8 and 11, the network of rails 26 is provided with a group of four, transversely arranged bulkheads, of which two, each indicated by the numeral 30, are located at one of the third points of the half length of the vehicle, and extend inwardly from opposite sides of the gridwork, for a distance about equal to ⅙ of the gridwork width. Thus the penetration of one-third of the air supply along the space under the load is limited by the two bulkheads 30, and the rails 26 at the inner ends of the bulkheads, to two rectangular zones at opposite sides of the load. For movement of the thus sequestered fraction of the air laterally of the gridwork, the vertical webs of the T members 26 are provided with a series of elongate apertures 32, aligned in a transverse direction. In this first third of the floor space, the rails 26 at and between the ends of the bulkheads 30 are imperforate, so that the remaining two-thirds of the air continue on past the gateway defined by the bulkheads.

In like manner, a second one-third portion of the air stream is sequestered by virtue of a second pair of bulkheads 34, located at the second third point of the vehicle half, and each extending inwardly from a side of the load for a distance equal to one-third of the width of the gridwork, so that each extends beyond the initial bulkhead 30 by a distance equal to one-sixth of the gridwork width, and thus interrupts one-sixth of the total air draft, for sideward disposal, the T members in the total, rectangular areas between bulkheads 30 and 34 being provided with apertures 32 for the purpose, and the T members meeting the inner ends of bulkheads 34 being imperforate.

Beyond bulkheads 34, the air streams from both ends of the vehicle are segregated by a full bulkhead 36, spanning the width of the gridwork, at the center of the vehicle, and the apertures 32 are provided in all T members 26 except the two adjacent members at the central, longitudinal line of the gridwork.

In connection with the foregoing operation, it should be borne in mind that selective entrainment of the air for surface treatment of a refrigerated load involves not only the baffle effect of the bulkheads, and the channeling through lateral aperatures, but also a close packing of the load, in covering relation to the T members 26. The provision for ready, upward movement of the draft, at the sides of the load, is an incident to certain alternative, gridwork structure, provided for handling of unrefrigerated loads, which constitute a spacing means, as will appear hereinafter.

The draft pattern described above, for conditioning a refrigerated load, may be viewed as a "fountain" arrangement, operable in a single, horizontal tier, with the branches of the fountain all at the same level, or vertical height. In the case of the treatment of "warm" loads, that is, loads at normal temperatures, the draft pattern will be one of permeation through interstices throughout the volume of the load, and in this case, the sequestration of portions of the moving air mass for selective distribution is accomplished in three tiers of gridwork, in which the flow pattern is more aptly termed an upward "cascade," for comparison with what was termed a "fountain" system in the case of refrigerated loads.

The three tiers of the cascade system are clearly visible in FIGS. 1, 2, 3, 4 and 5, and 8, 9 and 10. By comparison of FIG. 6 with FIG. 5, it will be seen that the two upper tiers are articulated, at their outer edges, to the side walls of the vehicle, for upward, swinging movement, to the vertical, stowed position shown in FIG. 6. In further description of the tier arrangement, it will also be helpful to note that FIGS. 8, 9, and 10 are viewed in the same direction as FIG. 5, that is, towards the middle of the vehicle, whereas FIG. 6 is viewed toward the end of the vehicle. Each tier, along one edge, has a series of upstanding ears 38, in pairs, to receive pivot pins 40, carried by fingers 42 of brackets 44, the latter secured by screws 46 to a shelf 48, carried by a corner member 50, of angle section, with an upright wall secured to the side vehicle wall, and a horizontal flange in clamping engagement with the base 28 of the lowermost, fixed tier unit. For convenience in handling, each layer, or tier unit, is made in three separate sections, such as the sections 52, 54, 56, indicated in FIG. 7, each provided with three of the hinge sets. In the showing of FIG. 7, the hinges of the top-tier panels 52, 54 and 56 are fully visible at the bottoms of the panels, and at the top, the hinges of the second-tier panels are partially concealed by the side edge portions of the top-tier panels 52, 54 and 56. Each panel is provided with a side-edge notch 58, adapted to receive a holding bolt 60, swing-mounted on a bracket 62 on the vehicle wall, and carrying a wing nut 64, and adapted to hold the panels in stowed, vertical position, during the handling of refrigerated loads.

For the operation of the inverted, cascade system, a second series of bulkheads are employed, in the middle tier, and the upper tier, also in conjunction with a series of apertures in the gridwork, but in this case, the apertures are in the base plates of the tier panels, and while the cascading is provided by limiting the longitudinal extent of progress of the draft, the full width of the gridwork passage is available for the draft, at all positions along the two upper tiers. The general pattern of the cascading is graphically illustrated by the systems of arrows in FIG. 1, wherein it will be seen that in the top tier, for instance, the flow is positively interrupted at one of the third points of a vehicle half length, by a bulkhead 66, so that between the entrance opening of this panel and the bulkhead at its end, the moving air finds escape only in an upward movement between the arms of the T members of the panel, and thence along vertical paths afforded by the available interstices in the load, whether naturally occurring, or arranged by design.

In the first panel 52 of the upper tier, the base plate 28 is imperforate, so that the supply of air entering the second tier, will find no means of upward escape in the first third of the vehicle half. However, the base plate of the second top panel is provided with elongate, rectangular openings 68, in pairs, in tandem (FIGS. 7 and 9), about as wide as the opening between the T arms, and extending for the major portion of the length of the panel, the legs of the T's being constituted by relatively short, bridge portions 70, 72. In conjunction wth a bulkhead 74 at the inner end of the second panel of the second tier, the air in the second tier is constrained, in the second, one-third zone of the system, to upward movement through openings 68, into the middle panel of the upper tier, and from thence through the spaces between the T's to a path of upward permeation through the load.

In the case of the third, or innermost zone of the gridwork, the draft moving along the fixed, lower tier 20 is constrained to upward movement, successively, through the middle tier and top tier, and for this purpose, the base plates of both top tier 24 and middle tier 22, are provided with the openings 68 (FIG. 10). At the inner end of this panel, the tiers are closed off by the respective bulkheads 66, 74 and 36.

Although in the three-tier system the lowermost tier still has the structure related to fountain-like operation, yet the lowering of the two upper tiers results in a degree of closure at the hinge lines, which minimizes flow to, and up, the sides of the load.

Figure 5:
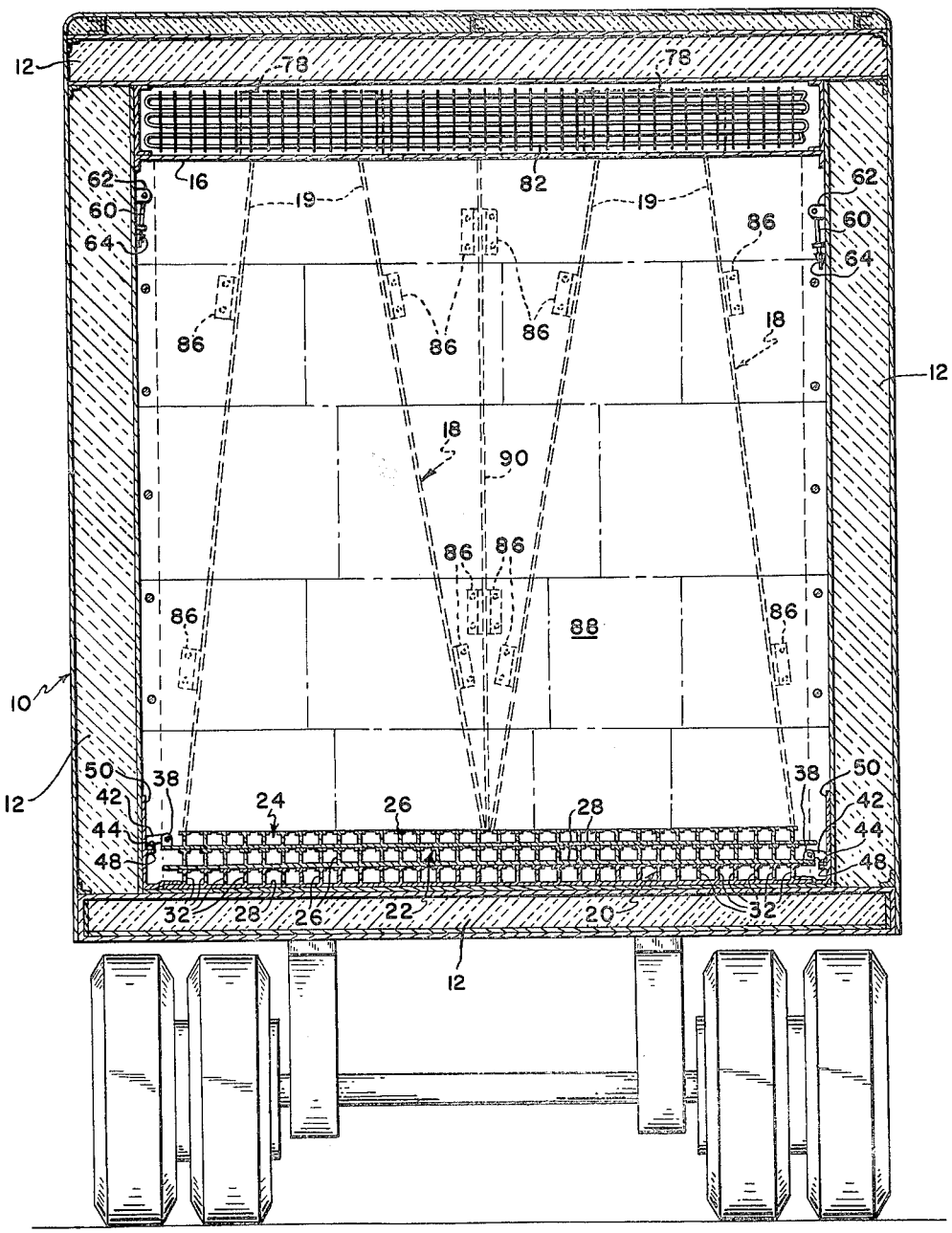
FIG. 5 is a vertical sectional view in a plane transversely of the trailer body, taken on the line 5—5 of FIG. 1.

The tri-partite feeding of the air draft to the three-tier system is provided for as follows:

As shown in FIG. 1, the draft is introduced from each end of the vehicle and worked toward a central plane of symmetry, for several important reasons, including the avoidance of imbalance, and consequent even distribution of the draft. For similar reasons the feed system is provided, at each end, in duplicate, on opposite sides of a central, longitudinal plane of symmetry. Thus, as shown in FIGS. 5 and 6, the pair of flared ducts 18, provided at each end of the vehicle lead air from their narrow, intake end, which is in communication with blowers 78, located at the top of the vehicle chamber, and housed in ducts 16, having cooling coils 82. The latter, together with associated engines and compressors, and the like components, which latter may be housed in a compartment 84, under the vehicle, form no part of the present invention, and therefore need not be described or illustrated in any further detail.

In a convenient manner of fabricating, the flared ducts 18 may be built up by installing the slanted sides 19 in perpendicular relationship on an end wall of the vehicle, with the aid of nailing cleats 86, angles or other means, and covering the outer openings of the ducts, by applying an outer, covering panel 88, which as shown is in two parts, and may be backed up at the line of separation by an upright, nailing board 90. The ends of the three-tier gridwork system are vertically aligned with covering board 88 (FIG. 2).

The air draft moving down through ducts 18 is divided into three equal parts, for introduction into the three-tier system, by means of a baffle system, of elongate angle plates, of generally L section, comprising an upper, inner member 92, an intermediate member 94, and a lower, outer member 96, all of which extend across the width of the vehicle, and may be secured to the walls thereof as by ears or tabs 98. It will be noted that the top edges of the upper and middle baffle members divide the incoming air into three parts, and the horizontal legs of these two members line up, respectively, with the base plates of the two upper tiers of the gridwork, so that the three-part current of air continues on into the three tiers of the bottom distribution system. Conveniently, a plate 100 is secured on top of the two-tier panel, for close, edge association with panels 88, to minimize leakage from the air stream, and also give support against flexure or chatter of panels 88.

In the use of the lower tier only, for refrigerated loads, the baffles 92, 94, may remain in place, but will be shut off by the load, which in this case is closely packed, and rests on top of the gridwork of the bottom tier. The baffles and ducts are structurally the same at both ends of the vehicle, but as shown in FIGS. 2 and 3, are arranged in mirror image relationship.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. In a system for air-conditioning enclosed loads of perishables comprising, in combination, a housing including a top, bottom, and opposed pairs of side and end walls, and a gridwork disposed on said bottom spaced inwardly from said opposed side walls, said gridwork including at least one lower tier including an air-inlet at one end and comprising a plurality of longitudinally disposed, transversely spaced elements having an upper support surface and forming longitudinally disposed passages opening upwardly and communicating with said air inlet, the outermost element adjacent at least one of said side walls including lateral openings beneath the upper support surface of said elements, and bulkheads extending transversely between groups of said longitudinally disposed elements in longitudinally spaced relation from said inlet, the bulkheads being of greater transverse width progressively from said air-inlet and forming a series of independent sections from which air directed through said air-inlet is divided and simultaneously discharged laterally from beneath the outermost elements.

2. A system for air conditioning a housing including a top, bottom and pairs of side and end walls, a gridwork disposed no the bottom of said housing, said gridwork including air-inlet at one end and spaced inwardly at opposite sides from said pair of opposed side walls, said gridwork comprising a plurality of juxtapositionable tiers, each of said tiers including means for baffling a portion of the air-supply from said air-inlet for distributing the air within said housing, all but the lowermost tier to be removed from juxtaposed relation with respect to said lowermost tier for permitting different types of air distribution to be used in relation to the product being air-conditioned.

3. The system as claimed in claim 2 in which said lowermost tier includes a plurality of longitudinal passages and transversely disposed bulkheads of progressively increasing length from said air-inlet and forming air distribution sections longitudinally spaced along said lower tier, the uppermost tiers being alternately hinged from opposite side and respectively to one of said side walls.

4. The system as claimed in claim 3 in which there are at least three tiers in said gridworks.

5. The system as claimed in claim 4 in which said top is disposed above said lowermost tier a distance greater than the width of said other two tiers, said other two tiers being positionably adjacent to the inner surface of the side wall to which they are hinged.

References Cited by the Examiner
UNITED STATES PATENTS

| | | | |
|---|---|---|---|
| 1,835,085 | 12/1931 | Robson | 98—54 |
| 2,584,727 | 2/1952 | Mellen | 98—54 |
| 3,076,320 | 2/1963 | Conradi | 62—418 |

MEYER PERLIN, *Primary Examiner.*